Patented Nov. 22, 1927.

1,650,390

UNITED STATES PATENT OFFICE.

JOHN M. RUGH, OF ELIZABETH, NEW JERSEY, ASSIGNOR TO AMERICAN CYANAMID COMPANY, OF NEW YORK, N. Y., A CORPORATION OF MAINE.

PROCESS OF PRODUCING FERROCYANIDES FROM CRUDE CALCIUM CYANIDES.

No Drawing.   Application filed October 30, 1923.   Serial No. 671,773.

This invention relates to a process of producing ferrocyanides from crude calcium cyanide containing among other impurities a considerable amount of sodium chloride, graphite and caustic lime. The raw material upon which the specific example, given below, of the process is based is described in U. S. Patent No. 1,359,257, to Walter S. Landis, and results from the treatment of calcium cyanamid as there set forth, but the present invention is neither based upon nor limited to this material.

One of the objects of this invention is to provide a procedure for the manufacture from the crude cyanide of a yellow prussiate of sodium of unusual purity, and to combine the steps in the transformation so that the said procedure will be simple, efficient, and rapid.

With these and other objects in view, the invention consists in the novel steps and combinations of steps constituting the process, all as will be more fully hereinafter disclosed and particularly pointed out in the claims.

As an example of the carrying out of this process, one may employ a strong solution of ferrous sulphate and add thereto said crude calcium cyanide in a steady stream. The rate at which the solid raw material is added depends largely upon the size of the tank and the efficiency of the agitation, but the rate of addition is usually so chosen that the reaction may be complete when the last portion of the solid material is stirred in. The temperature usually rises automatically nearly to the boiling point, and a sludge is formed in which the solids consist chiefly of calcium sulphate, calcium hydroxide and graphite. To this hot slurry, solid sodium carbonate is slowly added till but a slight amount of the calcium ferrocyanide in solution remains unacted on.

A proportion in which the materials may be employed are for example, 9 parts of ferrous sulphate, 18 parts of crude calcium cyanide, and 7 parts of sodium carbonate, all quantities being by weight.

For the purpose of more clearly understanding this invention, it may be assumed that when the crude calcium cyanide is added to the solution of ferrous sulphate, the said cyanide is completely changed into calcium ferrocyanide, and that this remains in solution. Likewise we may assume that on the addition of sodium carbonate, the calcium ferrocyanide is changed to sodium ferrocyanide, but this reaction does not proceed to completion for an insufficient quantity of sodium carbonate is usually employed, and therefore a small amount of the original calcium ferrocyanide is allowed to remain in solution with the sodium ferrocyanide formed in the final reaction. The restriction of the sodium carbonate in the manner just stated presumably avoids an interaction between the calcium sulphate in the sludge and an excess of sodium carbonate if it were present. That is, unless said sodium carbonate is restricted as stated, an excess of the same would be liable to occur, and such excess might lead to the production of sodium sulphate, and the presence of this latter has been found to reduce the yield of sodium ferrocyanide, which is the desired product in this invention. This said slight amount of calcium ferrocyanide which remains in solution is, however, finally removed by the addition of more sodium carbonate to the filtrate after the combined solids are removed. The actual amount of calcium carbonate thrown down from the resulting reaction is relatively very small and is also very easily removed by filtration.

From the above, it will be apparent that there is in reality but one important filtration necessary, and in this single step the solids consisting essentially of calcium sulphate, calcium hydroxide, calcium carbonate and graphite are removed, while the solution contains sodium ferrocyanide, sodium chloride and the small amount of calcium ferrocyanide referred to above.

Should one proceed by first filtering off the calcium sulphate and graphite after the addition of the crude calcium cyanide, it will be found that the solids are difficult to filter and require an excessive amount of wash water to remove even a fair proportion of the soluble calcium ferrocyanide present. And even after what is considered to be a practical washing there will still remain about 3% of the cyanide in the filter cake, which is lost. Further, one will find if he filters immediately after the addition of the crude calcium cyanide, that after the addition of the sodium carbonate if he again filters he will again lose about 1% in the cake. It therefore follows that the method first disclosed and forming the subject of the present invention obtains very important and remarkable results over what has been previously practiced.

In carrying out this invention, it has been discovered that contrary to the calcium sulphate and graphite precipitates being filtered with difficulty, the addition of the calcium carbonate, which is thrown down in the presence of the other solids, completely changes the nature of the mass of solids containing said sulphate and graphite precipitates, and that there results a loose porous material which filters easily and requires but a minimum of water for washing, and in addition does not retain the soluble salts by adsorption or other means. That is, in the double filtrations as practiced previously, the loss in the cakes amount to 3% and 1% respectively, as stated, while in carrying out the process of this invention one loses only 1% in the combined cake. After the solids have been thus removed by this invention, in a single filtration, the solution contains essentially only sodium ferrocyanide and sodium chloride. Any small amount of calcium ferrocyanide present is easily removed by sodium carbonate, as stated above, and the desired sodium ferrocyanide is separated out by crystallization.

It will now be clear that by selecting the reagents and arranging the order in which they are added, as well as paying attention to the time of filtering, difficulties that have been previously encountered may be readily overcome. That is, by following the foregoing disclosure one not only produces the precipitated solids in such a form that they may be easily filtered and will retain a minimum amount of soluble salts, but he also is enabled to separate out from the filtrate a yellow prussiate of sodium of an exceptional purity.

It is obvious that those skilled in the art may vary the details of the process without departing from the spirit of the invention, and therefore, I do not wish to be limited to the above disclosure except as may be required by the claims.

What is claimed is:

1. The process of producing sodium ferrocyanide from crude calcium cyanide which consists in mixing said calcium cyanide with a solution of ferrous sulphate in a quantity sufficient to react with all the sulphate present to produce calcium ferrocyanide; adding before filtration a quantity of sodium carbonate insufficient to react with all the said calcium ferrocyanide present to form sodium ferrocyanide in solution; separating out any precipitates present; adding to the solution thus formed sufficient sodium carbonate to convert any calcium ferrocyanide present; filtering out any precipitates formed; and recovering the desired sodium ferrocyanide thus produced.

2. A step in the process of producing sodium ferrocyanide from crude calcium cyanide which comprises adding to a solution of ferrous sulphate, an amount of solid crude calcium cyanide sufficient to convert all the cyanide present into ferrocyanide; then before filtering, adding sodium carbonate in an amount slightly less than that required to react with all the ferrocyanide present; and filtering off the combined solids.

3. The process of producing sodium ferrocyanide from crude calcium cyanide which consists in reacting on ferrous sulphate with crude calcium cyanide in the substantial proportions of two parts of cyanide to one part of sulphate, to form calcium ferro-cyanide; then before filtering adding sodium carbonate equivalent to substantially seven parts by weight of the anhydrous salt ($Na_2CO_3$) to each nine parts of sulphate originally employed; filtering the solution thus obtained; converting any calcium ferro-cyanide that may be present after filtration into sodium ferro-cyanide; and separating out the desired product.

4. In the process of producing sodium ferrocyanide from crude calcium cyanide the steps which comprise adding sodium carbonate to calcium ferrocyanide containing insoluble impurities, the quantity of added sodium carbonate being insufficient to react with all the calcium ferrocyanide, filtering the solution, and adding sufficient sodium carbonate to react with the remainder of the calcium ferrocyanide.

In testimony whereof I affix my signature.

JOHN M. RUGH.